(12) United States Patent
Weimann

(10) Patent No.: US 8,355,613 B2
(45) Date of Patent: Jan. 15, 2013

(54) OPTICAL FIBER CABLES

(75) Inventor: Peter A. Weimann, Atlanta, GA (US)

(73) Assignee: OFS Fitel, LLC, Norcross, GA (US)

( * ) Notice: Subject to any disclaimer, the term of this patent is extended or adjusted under 35 U.S.C. 154(b) by 423 days.

(21) Appl. No.: 12/386,649

(22) Filed: Apr. 21, 2009

(65) Prior Publication Data

US 2009/0245740 A1    Oct. 1, 2009

Related U.S. Application Data

(63) Continuation of application No. 11/879,633, filed on Jul. 18, 2007, now abandoned.

(60) Provisional application No. 60/927,475, filed on May 3, 2007.

(51) Int. Cl.
 *G02B 6/44* (2006.01)

(52) U.S. Cl. ............... 385/100; 385/107; 385/102

(58) Field of Classification Search .............. 385/100, 385/102, 103, 107
See application file for complete search history.

(56) References Cited

U.S. PATENT DOCUMENTS

| | | | | |
|---|---|---|---|---|
| 5,390,273 | A * | 2/1995 | Rahman et al. | 385/112 |
| 2003/0021557 | A1* | 1/2003 | Eichelberger et al. | 385/101 |
| 2003/0118296 | A1* | 6/2003 | Smith | 385/102 |
| 2005/0013573 | A1* | 1/2005 | Lochkovic et al. | 385/128 |
| 2006/0198585 | A1* | 9/2006 | Keller et al. | 385/107 |

* cited by examiner

*Primary Examiner* — Ellen Kim
(74) *Attorney, Agent, or Firm* — Law Office of Peter V. D. Wilde

(57) ABSTRACT

Described is an optical fiber cable designed for drop cable applications that has a compact profile, and is suitable for both the indoor and outdoor portions of the installation. The new design has three functional units, an optical fiber subunit, and two strength members arranged side-by side on either side of the optical fiber. The overall cable cross section round. In a preferred embodiment, the optical fiber module of the cable has a coupled fiber design.

16 Claims, 5 Drawing Sheets

OPTICAL FIBER CABLES

RELATED APPLICATIONS

This application is a continuation of U.S. application Ser. No. 11/879,633, filed Jul. 18, 2007, now abandoned which application claims the benefit of provisional application 60/927,475 filed May 3, 2007, which is incorporated herein by reference.

FIELD OF THE INVENTION

This invention relates to optical fiber cables specially adapted for drop line applications.

BACKGROUND OF THE INVENTION (Parts of this background may or may not constitute prior art.) Fiber-to-the-premises (FTTP) from local telephone and cable service providers is rapidly being implemented. This service requires a broadband optical fiber distribution network comprising local optical fiber distribution cables that are installed in neighborhoods and city streets. The local distribution cable is a large fiber count (multi-fiber) cable. Single fiber or few fiber cables are used for the "drop" line from the street to the premises. In many cases, aerial drop lines are used, and these have special requirements. In other cases, buried drop lines are used, and these have different requirements.

Optical fiber drop cables are made in several designs. Most of these designs mimic earlier copper cable versions. In many cases, physical resemblance is deliberate, so that the external cable appearance matches that of existing copper versions, and standard hardware and installation equipment may be used for both. Thus "A-drop" optical fiber cable is an optical fiber version of A-drop copper cable, and is made in the same flat or ribbon-like configuration. Aerial drop cable typically has one or more strength members for support. A common A-drop or flat cable design comprises one or more optical fibers between two strength members. See for example, U.S. Pat. Nos. 4,761,053, 6,836,603, and 6,501,888.

Optical fiber cables also commonly contain gel-filling compounds for preventing water excursion in the cable. When water enters a filled cable, flow of water along the length of the cable is blocked by the gel. However, gel filled cables are time consuming to install and repair, as the gel must be completely removed from the optical fiber prior to fusion splicing operations. Moreover, since the drop wire is typically attached to the side of a customer's home or building, bleeding of ingredients in the cable onto the customer's building may cause cosmetic or other problems. Optical drop cables containing gel compounds may also be factory preterminated or 'connectorized' using 'plug and play' optical connectors. In this case the time and expense of field fusion splicing may be avoided through factory installation of an outside plant rated connector. However, factory assembly personnel pre-installing the connectors face issues with time-consuming, expensive complete removal of gel prior to connectorization.

Since aerial drop cables are subjected to considerable stress and sag due to wind and ice build-up, these cables typically have reinforcement members both to support the cable and to protect the optical fiber module inside the cable. A common arrangement is to center the optical fiber(s) between two strength members. The optical fibers are contained within an optical fiber module, bounded on each side by a round strength member. The centers of the optical fiber module and the strength members are typically arranged in-line. The resulting cable cross-section is typically has a flattened, elongated, race-track shape.

Experience with installation and use of these cables has revealed several disadvantages to the basic cable design.

1. Stiffness. These cables are rigid and stiff and difficult to bend or handle.
2. Size. The 300 lb. tensile requirement (Telcordia GR-20 and ICEA-S-717 standards for Outside Plant optical cables) leads to a large cable footprint, typically about 4×8 mm, often used to house a single optical fiber 0.25 mm in diameter.
3. Non-circular cross-section. More difficult to manufacture and handle
4. Not flame retardant. Typically terminated outside the home and the signal must be transitioned to the indoor network. Part of this is a function of size.

New designs for FTTP drop cable that offer compact size and low cost are continually being sought. In many applications it is desirable to use an optical drop cable indoors, for example to transition from the outdoor network to an indoor 'set-top box' optical network unit that will receive the optical signal and decode voice, data, and video signals. Alternately optical drop cables may be used indoors to provide service to multi-dwelling units (MDUs) such as condominiums, townhouses, or multi-story apartment buildings. One approach to design of optical cables for this environment is to: omit large fiberglass strength members used in outdoor cables, use instead aramid strength yarns; reduce the tensile load rating of the cable; and jacket the cable with a flame-retardant plastic compound, suitable for indoor use. This results in a compact indoor cable, and is typically the option chosen for current installations. For example, 3.0 mm diameter indoor interconnect cordage with a tensile rating of 50 to 100 lbs. is often used for this application. However, there are several drawbacks to this also; the indoor cables are less robust than outdoor cables, and the service provider must arrange for a transition from the outdoor network to the indoor network for this application.

Therefore, it would be desirable to have a single compact cable design that is suitable for the drop (outside) portion of the installation, and also for the indoor wiring, such that it may be passed between the two environments with no transition required.

In summary, existing drop cable designs are large and stiff, and not suitable for use in both outside and inside installations. Typical cable designs for inside wiring are not adequate for outside service.

A single cable design that meets the criteria for both inside and outside FTTH installations would represent a significant advance in the art.

STATEMENT OF THE INVENTION

We have designed an optical fiber cable suitable for drop cable applications that has a compact profile, and overcomes at least in part the drawbacks just mentioned. The new design has three functional units arranged side-by side, but the overall cable cross section is essentially round. In a preferred embodiment, the cable uses tight buffered optical fiber and aramid yarns that allow for rapid connectorization using standard optical connectors. Optical fiber cables with the construction of the invention may be designed for use both indoors and outdoors, thus simplifying FTTH installations.

DETAILED DESCRIPTION

Figure 1:
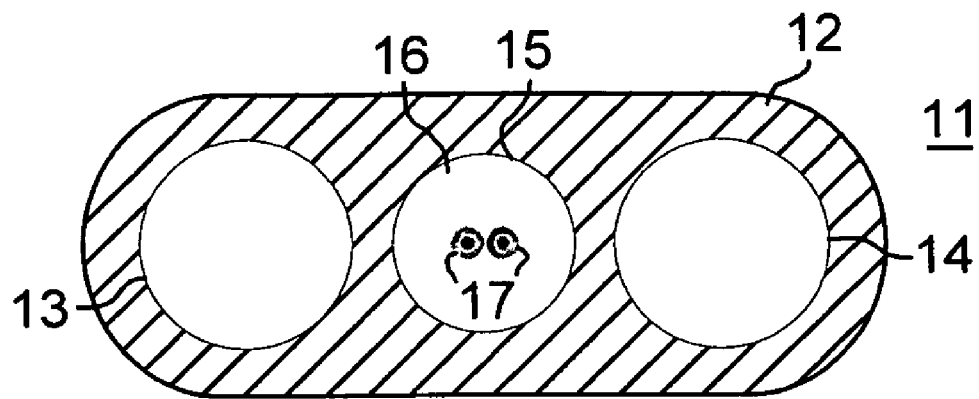
FIG. 1 is a sectional view of one embodiment of a conventional optical fiber drop cable.

Referring to FIG. 1, a flat optical fiber drop cable 11 is shown with optical fiber module 15 and strength members 13 and 14. The optical fiber tube 15 comprises two optical fibers 18, an extruded plastic buffer tube 17, and a gelled filling compound 16. The strength members 13 and 14 are typically glass fibers bonded and encased in a rigid thermoset resin, forming a rod structure. The three modules are encased in a common outer jacket or encasement 12, with the centers of the optical fiber module and the centers of the strength members in-line. The strength members 13 and 14 are preferably approximately the same size, as shown, which imparts symmetry to the cable cross section.

Figure 2:
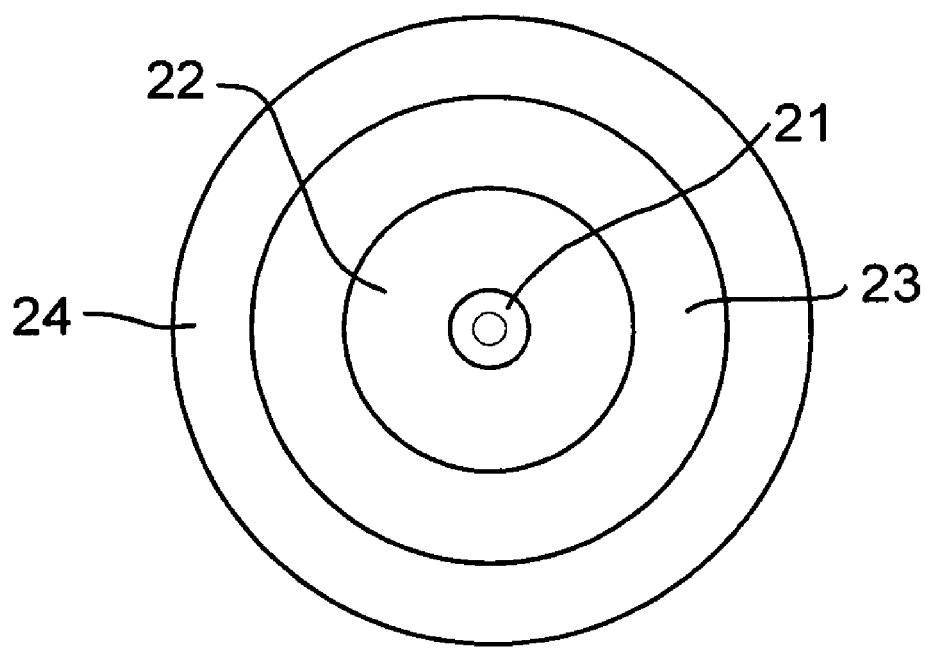
FIG. 2 is sectional view of a single or few fiber cable designed for indoor installation.

FIG. 2 shows an optional cable design with strength members omitted. The cable has optical fiber 21 with a conformal tight buffer 22, an aramid protective layer 23, and outer sheath 24. This design allows for a very flexible cable with a small form factor. The overall size typically may be 2-4 mm. Moreover, in contrast with the cable of FIG. 1, this cable is round in cross section, thus easier to handle and install. This embodiment, sometimes referred to as cordage, is suitable for inside installations. However, it has these drawbacks:

1. Poor crush resistance. The Telcordia GR-409 standard maximum compression load for this sort of cable is 3.5 N/mm. The concern is that such a cable is not robust enough for in-home installation by moderately skilled craftspeople. For example, if this cable is run in a basement and stapled to overhead floor joists, it must be sufficiently robust to survive the pressure of a staple gun.
2. Too flexible. Anything that is installed in the home environment is potentially vulnerable to abuse or damage. Flexible cordage is vulnerable to being bent in such a manner that fibers are broken or subjected to high strain such that long-term mechanical reliability is at risk.
3. Insufficiently robust for outdoor installations. These cables can be made UV-resistant and waterblocking, but the basic design is not adequate for outdoor aerial or buried portions of an installation.

Figure 3:
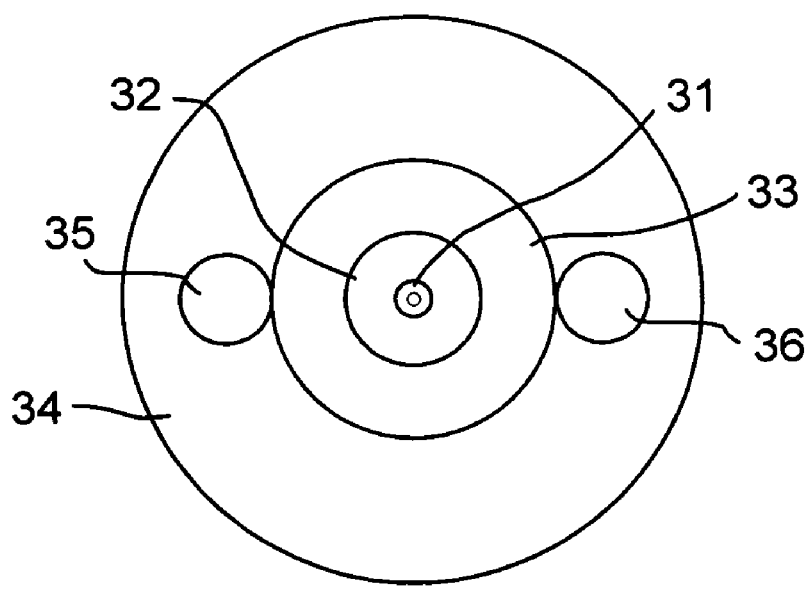
FIG. 3 is a sectional view of one embodiment of the optical fiber cable of the invention.

FIG. 3 depicts an embodiment of the invention. It is suitable for use as both the inside and the outside (drop)-segments of the installation. The cable comprises optical fiber 31 encased in tight-buffered polymer encasement 32. This forms the optical fiber module, which is typically 900 microns in diameter to meet standard coupling and splicing equipment and techniques. Other sizes may be used, e.g. 600 microns. The tight-buffer material 32 is preferably a stiff, robust dual-layer nylon/ethylene-acrylic acid copolymer. Details of this buffer layer are given in U.S. Pat. No. 5,684,910. In a preferred embodiment the outer layer is Degussa "Vestamid L1670" nylon 12, the inner layer is Dow Chemical's "Amplify EA 103" functional ethylene/acrylic acid copolymer. However the buffer material can could be any suitable plastic material, including PVC, thermoplastic elastomers such as DuPont's "Hytrel" materials, fluoropolymers, nylon, poly(butylene terephtalate), or UV-cured acrylate resins.

The encasement 32 is tightly fitting to the optical fiber polymer coating. It will be recognized that this is in contrast to the common approach to controlling microbending losses by mechanically decoupling the optical fibers from the surrounding cable. In decoupled structures, mechanical impacts and stresses on the cable are not translated, or minimally translated, to the optical fibers. However, a number of advantages result from using a tight-buffered encasement that deliberately couples the optical fiber to the surrounding cable medium. These are described in U.S. Pat. No. 6,973,245, issued Dec. 6, 2005, which patent is also incorporated herein by reference. This patent gives details of coupled optical fiber encased systems for single or few fiber cables. It also describes the optical fibers as comprising a core, a cladding and a polymer coating. Among the advantages of coupled conformal encasements is that they are inherently water blocking. A discussion of coatings or encasements for optical fiber ribbon cables appears in U.S. Pat. No. 6,317,542 issued Nov. 13, 2001. This patent describes a variety of embodiments wherein conformal encasements are used for optical fiber ribbon stacks, and this patent is incorporated herein by reference.

The term "encasement" as used in this description is defined as the primary medium that surrounds the optical fibers.

Referring again to FIG. 3, the tight-buffered optical fiber is wrapped with a layer 33 of aramid yarns. Teijin Twaron BV's Twaron Type 1055 waterswellable high modulus material is suitable. Other high-strength polyaramid yarns, or other high strength polymer yarns, can be used as well. The yarn is advantageously coated with a waterswellable coating when the cable is to be used for outdoor-indoor applications. Waterswellable coating is not necessary for indoor-only applications. Waterswelling functionality may also be incorporated through application of superabsorbent polymer powders, spun yarns containing superabsorbent fibers, or other filamentary material coated or impregnated with waterswellable polymers.

According to an aspect of the invention, the optical fiber subassembly is shielded with side protective members 35 and 36, and the side members are placed in-line with the optical fiber 31, i.e., the centers of the side protective members 35 and 36, and the center of the optical fiber, lie approximately on the same axis. Preferred for protective members 35, 36 are fiberglass rods encapsulated in a stiff matrix of a thermoset resin so as to provide high tensile and compressive stiffness. Positioning the two rods as shown, i.e. with the centers of the rods and the center of the optical fiber optical in-line offers favorable crush resistance. Suitable rods are commercially available under the brand name "Qualistrand" from CrWW & Associates, Hope Valley, R.I. The rods 35 and 36 are preferably imbedded in the cable jacket 34 as shown in FIG. 3.

The cable jacket may be one or more of a wide variety of materials depending on the application. For example, if the cable is to be used outdoors only, the jacket may be made of polyethylene containing carbon black. If the cable is to be used indoors, it may be made of a flame-retardant PVC, fluoropolymer, flame-retardant nylon, or a flame-retardant, polyolefin based nonhalogen material. However, for indoor/outdoor applications the preferred cable jacket is a UV-resistant resin that has good flame retardancy, such as Dow Chemical DFDE-1638-NT EXP2 polyolefin-based FR nonhalogen resin, or AlphaGary GW 2271-VW1 BLK.LA UV FG 2635 outdoor/indoor PVC. The cable may be made riser or plenum rated as needed.

In the embodiments described, and specifically with two 0.7 mm diameter fiberglass rods and 6 strands of 2420 dTex Twaron Type 1055 waterswellable aramid yarn, the cable has a calculated tensile rating of 220 lbs. (approximately 990 N). The small size and reduced weight of this cable design allows for long span length in aerial installations. In NESC heavy ice and wind loading zones, a useful self-supporting span length is approximately 150 feet. Conventional drop cables used in aerial installations typically carry large steel or fiberglass strength members. The replacement of these with aramid contributes to the reduction in weight and size. The useful span length is inversely proportional to the cable diameter. This is partly due to the fact that the amount of ice that can form on a cable depends on the surface area of the cable. Thus the very small size of this cable relative to conventional drop cables contributes to long span lengths in aerial installation. The calculated NESC heavy loading zone span length for the cable depicted in FIG. 3 is approximately 165 feet.

The embodiment depicted in FIG. 3 is also suitable for use in underground cable installations. If the optical drop cable is to be installed in a small underground duct, or 'microduct', the rigid fiberglass rods 35 and 36 provide compressive stiffness sufficient to allow the cable to readily pushed or pulled through the duct, especially through any areas where the duct changes direction in the underground route. The prior art cable depicted in FIG. 1 can be easily pushed through such a duct, but a duct with an inner diameter of at least 10 mm is required to accommodate such a large cable. The cable depicted in FIG. 3 can be installed in a duct with an inner diameter as small as 5 mm. The prior art cable depicted in FIG. 2 may not have the compressive resistance necessary to allow it to be pushed through a duct, or easily pulled around a corner in a duct route.

For use in direct-buried applications, the cable depicted in FIG. 3 may also incorporate metallic members for location and/or protection. The cable may be used as one component of a 'figure 8' design with a strippable copper toning wire that allows for use of a locating device to detect the buried cable, in order to prevent or limit the possibility of dig-ups and associated interruption in service. In order to provide service either at the side of a residence or in a residence, the copper toning wire may be stripped away from the cable in the field, using common hand tools, thus eliminating the need for grounding the copper wire at the house.

Alternately the cable may be encased in corrugated or interlocking metallic armor made from steel, stainless steel, or aluminum to allow for detection as well as providing mechanical protection against chewing rodents and accidental dig-ups. For the case of outdoor/indoor cables, this armor may be stripped off the cable at the point where the cable enters the residential unit.

Figure 4:
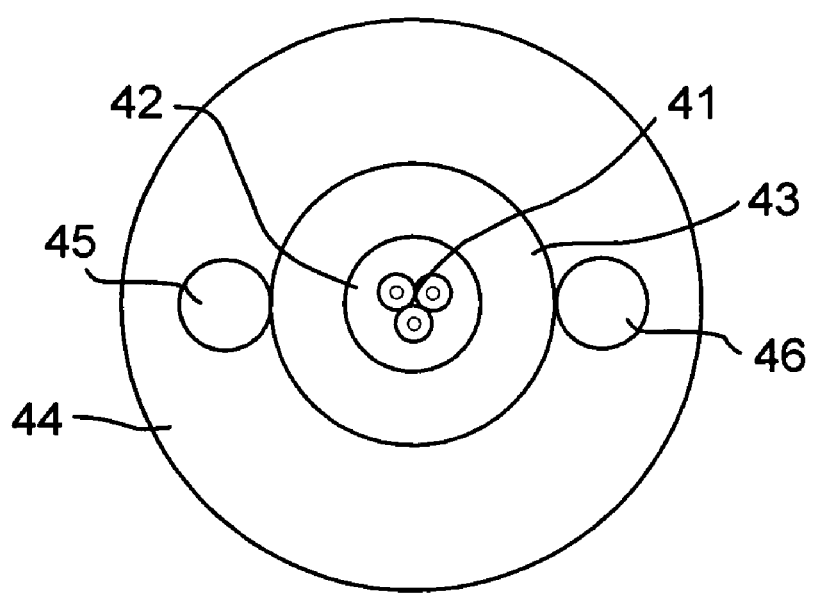
FIGS. 4-7 are schematic views showing alternative embodiments of the invention.

The embodiment of FIG. 3 is a single fiber cable. Multiple fiber cables also can be made according to the principles of the invention. FIG. 4 shows a three-fiber cable, with three fibers 41 encased in tight-buffer 42. For FTTH applications, and small business installations, cables with 1-3 fibers will normally be used. In these figures, i.e. FIGS. 3-10, reference numbers 22, 32, 42, etc. denote similar elements.

Figure 5:
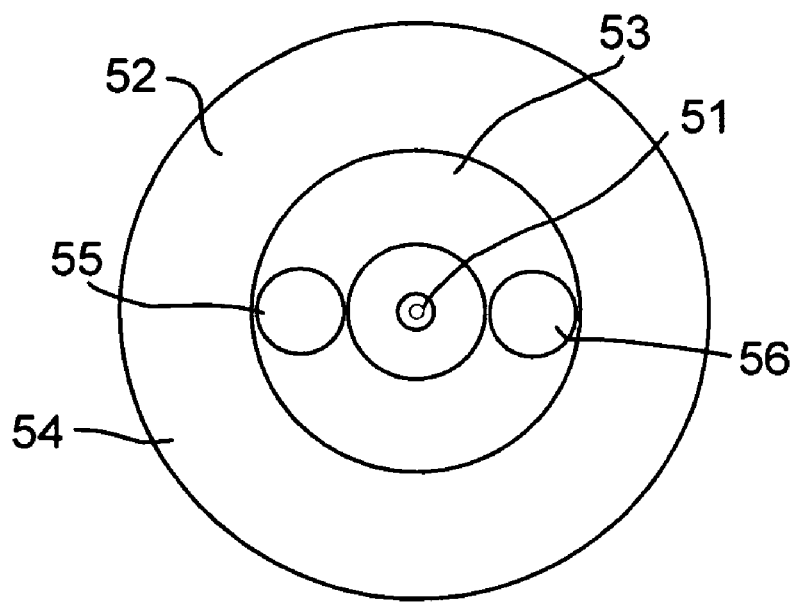
Figure 6:
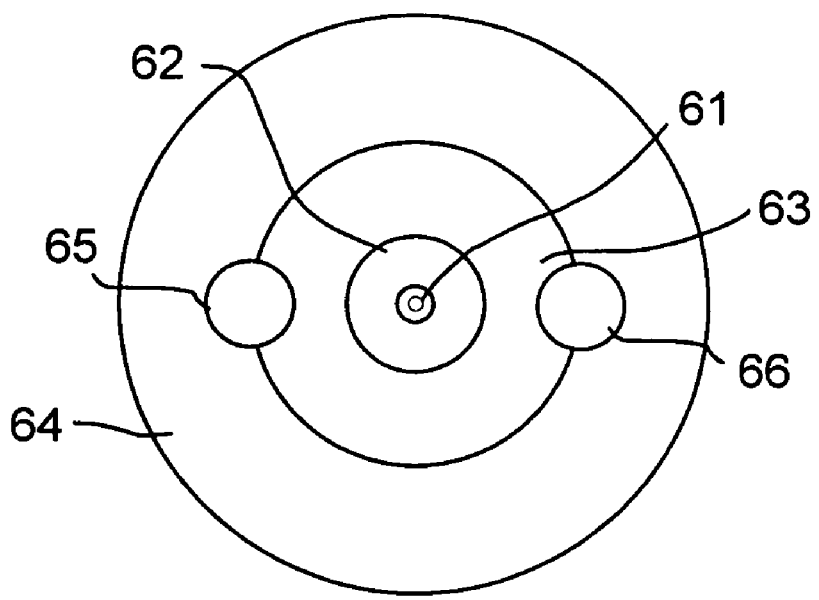
Figure 7:
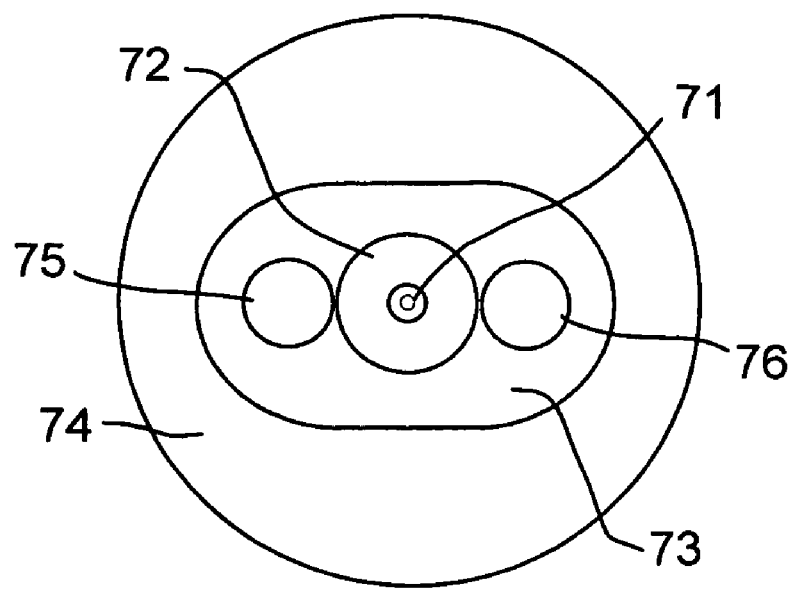

FIGS. 3 and 4 show the rods 35, 36, 45, 46, fully embedded in the jacket, but other arrangements are useful. FIGS. 5-7 show alternative arrangements.

FIG. 5 shows rods 55, 56 embedded in aramid layer 53.

FIG. 6 shows rods 65, 66 partially embedded in aramid 63 layer and partially embedded in jacket 64.

FIG. 7 shows rods 75, 76 and tight-buffered optical fiber 71, 72, arranged in-line and wrapped with aramid layer 73. The aramid layer has a racetrack shape, i.e. semi-circles separated by straight side portions.

Various combinations of rigid rods and aramid yarns may be used to optimize tensile strength, crush resistance, and bend limiting for different applications. For example, for an indoor only application a robust cable that resists stapling and sharp bends may be made using 0.6 mm or 0.5 mm glass rods with 4 ends of 1610 dTex aramid yarn.

Among many advantages of the cable design described here are:

Smaller size than conventional 300 lb. drop cable. Cables made according to the invention are typically less than 5 mm, e.g. 3-5 mm. Typical drop cables with steel armor are approximately twice that size.

Can be manufactured and used as an indoor-outdoor cable, i.e. can be run into a residence with no need for termination or transition from one cable design to another.

Compared to conventional indoor cordage it is more robust. Glass rods provide a level of crush resistance not found in conventional indoor cable.

Round cross section. Easy to package, route and handle.

Naturally bend-limiting. Standard cordage, with only aramid yarn, can be deformed into a knot—with disastrous consequences for the fiber. The glass rods in this design 'push back' when the cable is bent tightly.

Compatibility with standard optical connectors. Use of buffered fiber and aramid yarn makes this cable readily compatible with most standard connector types. The 900 micron buffer naturally fits in most connectors, and the aramid yarn is compatible with crimping procedures with most common connectors.

Figure 8:
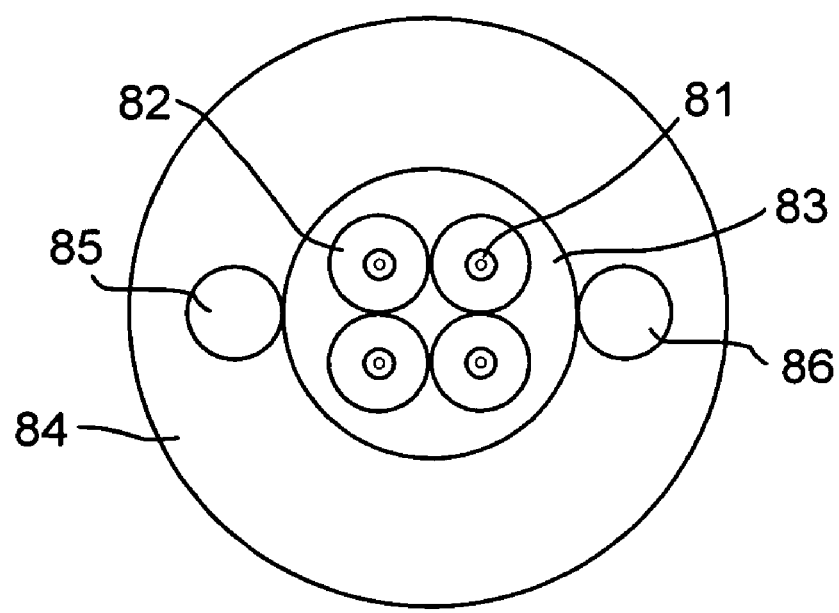
FIG. 8 is a schematic view of a preferred embodiment of a multi-fiber cable.

FIG. 4 shows one embodiment of a multi-fiber cable wherein the multiple fibers are encased in a common tight buffer. A preferred embodiment of a multi-fiber cable is shown in FIG. 8 wherein four optical fibers are shown, each with a separate tight buffer. The construction is adapted for efficient connectorization wherein each buffered fiber is independently exposed when the cable jacket is stripped, and each can be independently and conveniently handled when the connector is applied. Moreover, the provision of separate buffers allows these fibers to be color coded.

Figure 9:
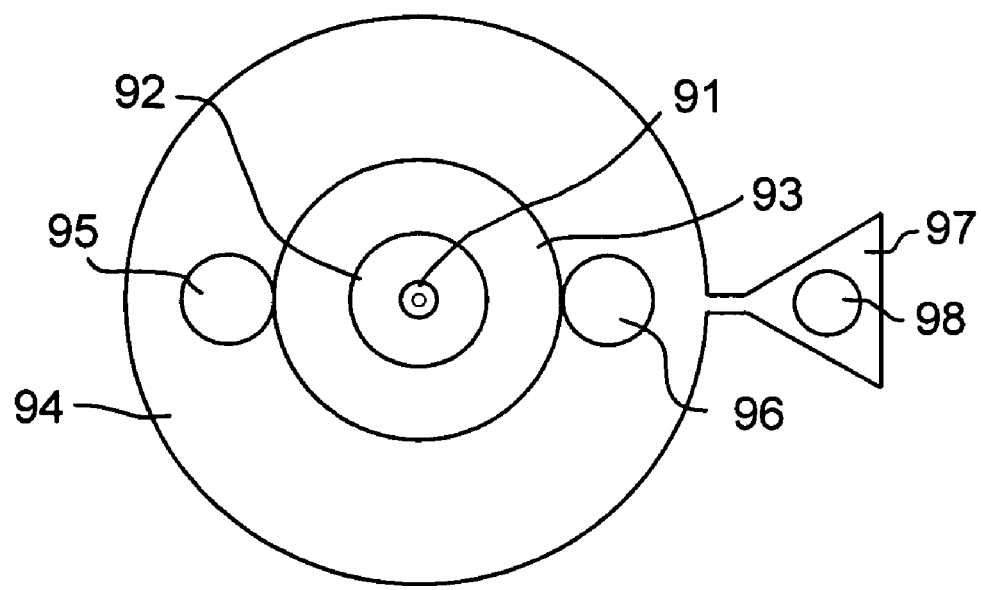
FIG. 9 is a schematic view of an embodiment of the invention wherein the cable is provided with a tone-detecting element.

As mentioned above the cable depicted in FIG. 3 may also incorporate metallic members for location and/or protection. These expedients would be normally used for buried installations. FIG. 9 shows a cable similar in design to that of FIG. 3 but with a locating accessory 97 added. The added accessory 97 carries a "toning wire" 98, which is a copper wire or similar metallic member used for locating a buried cable with an electrical locating device. In order to provide service either at the side of a residence or in a residence, the copper toning wire may be stripped away from the cable in the field, using common hand tools, thus eliminating the need for grounding the copper wire at the house.

Figure 10:
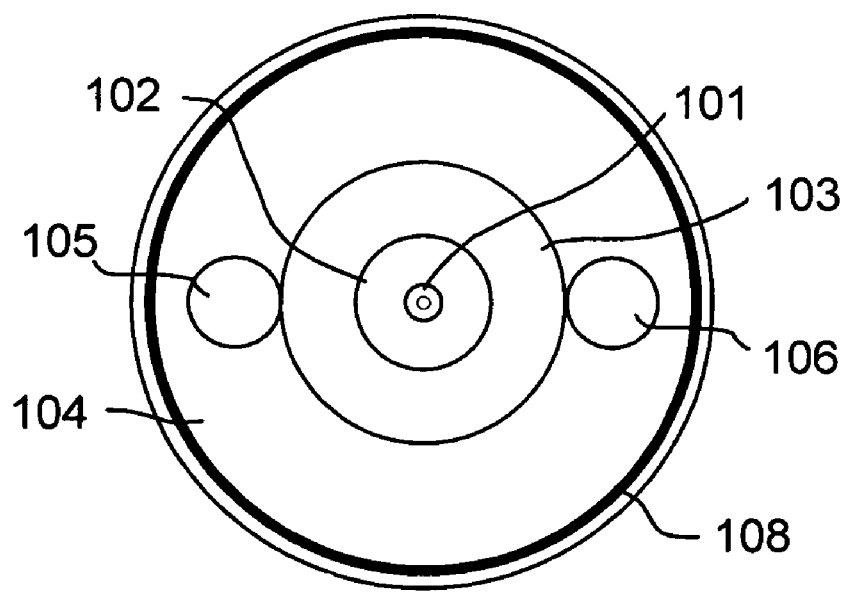
FIG. 10 shows an embodiment wherein the cable is armored.

An alternative construction that allows for locating a buried cable, and offers added protection for the buried cable is shown in FIG. 10. Here the cable is encased in corrugated or interlocking metallic armor 108. The armor may be made from steel, stainless steel, or aluminum to allow for detection as well as providing mechanical protection against chewing rodents and accidental dig-ups. For the case of outdoor/indoor cables, this armor may be stripped off the cable at the point where the cable enters the residential unit.

Modifications in the geometry of the elements shown may be made while still achieving the benefits of the invention. For example, the strength members are shown in the figures as having a round cross section. Also the optical fiber system is shown with a round cross section. Either of these shapes may be varied.

Various other modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. Method for installing optical fiber cable comprising the step of running the cable to an outside installation and running a portion of the cable to an inside installation wherein the optical fiber cable comprises:
   (a) an optical fiber subassembly comprising at least one optical fiber encased in a tight buffer encasement, the optical fiber comprising a core, a cladding and a polymer optical fiber coating, and the tight buffered encasement consisting essentially of a polymer medium tightly fitting to the polymer optical fiber coating,
   (b) a layer of high-strength polymer yarn surrounding the optical fiber subassembly, thus forming a yarn-wrapped optical fiber subassembly,
   (c) a rigid strengthening rod extending along a first side of the yarn-wrapped optical fiber subassembly,
   (d) a rigid strengthening rod extending along a second side of the yarn-wrapped optical fiber subassembly,
   (e) a cable jacket surrounding the polymer yarn layer and the pair of rigid strengthening rods, the cable jacket having a round cross section,
the method further comprising the steps of separating a portion of the optical fiber subassembly from elements (c) (d) and (e), and running the portion to the inside installation.

2. The method of claim 1 wherein the rigid strengthening rods comprise fiberglass, and the polymer yarn is a polyaramid.

3. The method of claim 2 wherein the diameter of the cable jacket cross section is less than 5 mm.

4. An optical fiber cable comprising:
   (a) an optical fiber subassembly comprising at least one optical fiber encased in a tight buffer encasement, the optical fiber comprising a core, a cladding and a polymer optical fiber coating, and the tight buffered encasement consisting essentially of a polymer medium tightly fitted to the optical fiber coating,
   (b) a layer of high-strength polymer yarn surrounding the optical fiber subassembly, thus forming a yarn-wrapped optical fiber subassembly,
   (c) a rigid strengthening rod extending along a first side of the yarn-wrapped optical fiber subassembly,
   (d) a rigid strengthening rod extending along a second side of the yarn-wrapped optical fiber subassembly,
   (e) a cable jacket surrounding the polymer yarn layer and the pair of rigid strengthening rods, the cable jacket having a round cross section,
the optical fiber subassembly adapted to be separated from (c) (d) and (e).

5. The optical fiber cable of claim 4 wherein the optical fiber and the rigid strengthening rods are in-line.

6. The optical fiber cable of claim 5 wherein the rigid strengthening rods are embedded in the cable jacket.

7. The optical fiber cable of claim 5 wherein the rigid strengthening rods comprise fiberglass.

8. The optical fiber cable of claim 7 wherein the polymer yarn is polyaramid.

9. The optical fiber cable of claim 5 wherein the rigid strengthening rods are embedded in the polymer yarn.

10. The optical fiber cable of claim 5 wherein the rigid strengthening rods are partly embedded in the polymer yarn and partly embedded in the cable jacket.

11. The optical fiber cable of claim 5 wherein the layer of high-strength polymer yarn has a racetrack shape.

12. The optical fiber cable of claim 5 wherein the cross section of the cable jacket has a diameter of less than 5 mm.

13. The optical fiber cable of claim 5 wherein the cable has two or more optical fibers wherein each of the optical fibers has a separate buffer encasement to form a buffer encased optical fiber subunit, and the two or more subunits are encased in a common buffer.

14. The optical fiber cable of claim 13 wherein the separate buffer encasements are color-coded.

15. The optical fiber cable of claim 5 further including a metal armor layer.

16. The optical fiber cable of claim 5 further including a toning wire.

* * * * *